(12) United States Patent
Martin et al.

(10) Patent No.: US 9,272,706 B2
(45) Date of Patent: Mar. 1, 2016

(54) LASER IGNITION SYSTEM BASED DIAGNOSTICS

(71) Applicant: Ford Global Technologies, LLC, Dearborn, MI (US)

(72) Inventors: Douglas Raymond Martin, Canton, MI (US); Lauren Angelina Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 13/865,089

(22) Filed: Apr. 17, 2013

(65) Prior Publication Data
US 2014/0316622 A1   Oct. 23, 2014

(51) Int. Cl.
| | |
|---|---|
| *B60W 20/00* | (2006.01) |
| *B60W 10/06* | (2006.01) |
| *B60W 10/08* | (2006.01) |
| *F02P 23/04* | (2006.01) |
| *F02D 41/00* | (2006.01) |
| *F02D 41/22* | (2006.01) |
| *F02N 19/00* | (2010.01) |
| *F02D 35/02* | (2006.01) |

(52) U.S. Cl.
CPC ............. *B60W 20/50* (2013.01); *B60W 10/06* (2013.01); *B60W 10/08* (2013.01); *F02P 23/04* (2013.01); *B60W 2510/0685* (2013.01); *B60Y 2300/64* (2013.01); *F02D 35/022* (2013.01); *F02D 41/009* (2013.01); *F02D 41/22* (2013.01); *F02N 19/005* (2013.01); *Y02T 10/6286* (2013.01); *Y10S 903/93* (2013.01)

(58) Field of Classification Search
CPC ...... B60W 10/06; B60W 10/08; B60W 20/50
See application file for complete search history.

(56) References Cited

U.S. PATENT DOCUMENTS

| | | | | |
|---|---|---|---|---|
| 5,367,869 | A  * | 11/1994 | DeFreitas | 60/776 |
| 5,673,550 | A  * | 10/1997 | Few et al. | 60/776 |
| 6,520,142 | B2 * | 2/2003 | Nogi et al. | 123/299 |
| 6,762,835 | B2 * | 7/2004 | Zhang et al. | 356/318 |
| 6,873,902 | B2 * | 3/2005 | Welch | 701/111 |
| 7,899,608 | B1 * | 3/2011 | Pederson | G01M 15/11 701/111 |
| 2001/0009147 | A1* | 7/2001 | Takashima et al. | 123/406.14 |
| 2002/0002430 | A1* | 1/2002 | Nada | B60K 6/445 701/33.4 |
| 2006/0032471 | A1* | 2/2006 | Yalin et al. | 123/143 B |

(Continued)

OTHER PUBLICATIONS

Martin, Douglas Raymond et al., "Engine with Laser Ignition and Measurement," U.S. Appl. No. 13/689,601, filed Nov. 29, 2012, 44 pages.

(Continued)

*Primary Examiner* — Mussa A Shaawat
(74) *Attorney, Agent, or Firm* — Julia Voutyras; Alleman Hall McCoy Russell & Tuttle LLP

(57) ABSTRACT

Methods and systems are provided for enabling engine diagnostics, including visual inspections of an engine cylinder, using existing hardware from a laser ignition system. Light pulses from a laser ignition device are received at a photodetector during non-combusting conditions and used to generate images of an inside of the cylinder that can be assessed by a service technician. An electric motor of the vehicle system can be used during a service mode of the vehicle to rotate the engine to, and hold the engine at, specified engine positions that enable the technician to perform selected diagnostic tests.

14 Claims, 5 Drawing Sheets

(56) References Cited

U.S. PATENT DOCUMENTS

| | | | |
|---|---|---|---|
| 2006/0037572 A1 | 2/2006 | Yalin et al. | |
| 2006/0055925 A1* | 3/2006 | Yalin et al. | 356/318 |
| 2006/0142906 A1* | 6/2006 | Brozovich et al. | 701/29 |
| 2009/0150019 A1* | 6/2009 | Sakamoto et al. | 701/29 |
| 2010/0252546 A1 | 10/2010 | Herden et al. | 219/205 |
| 2011/0075055 A1 | 3/2011 | Bilbrey | |
| 2011/0288723 A1* | 11/2011 | Weiss et al. | 701/34 |
| 2012/0078564 A1* | 3/2012 | Goodwin | 702/116 |
| 2013/0066514 A1* | 3/2013 | Das | 701/31.5 |
| 2013/0261859 A1* | 10/2013 | Sugimoto | 701/22 |
| 2013/0297137 A1* | 11/2013 | Fushiki et al. | 701/22 |
| 2013/0338867 A1* | 12/2013 | Sato | B60W 10/06 701/22 |
| 2014/0067179 A1* | 3/2014 | Amano et al. | 701/22 |
| 2014/0067200 A1* | 3/2014 | Amano | B60K 6/442 701/34.4 |
| 2014/0149018 A1* | 5/2014 | Martin | F02D 41/062 701/102 |
| 2014/0149019 A1* | 5/2014 | Martin | F02D 41/009 701/103 |
| 2014/0149023 A1* | 5/2014 | Martin | F02P 9/00 701/113 |
| 2014/0330466 A1* | 11/2014 | Bureau et al. | 701/22 |

OTHER PUBLICATIONS

Martin, Douglas Raymond et al., "Engine with Laser Ignition and Measurement," U.S. Appl. No. 13/689,578, filed Nov. 29, 2012, 54 pages.

Martin, Douglas Raymond et al., "Laser Ignition System Based Diagnostics," U.S. Appl. No. 13/865,088, filed Apr. 17, 2013, 41 pages.

Martin, Douglas R. et al., "Laser Ignition and Misfire Monitor," U.S. Appl. No. 13/677,641, filed Nov. 15, 2012, 30 pages.

Martin, Douglas R. et al., "Engine With Laser Ignition and Measurement," U.S. Appl. No. 13/689,601, filed Nov. 29, 2012, 44 pages.

Martin, Douglas R. et al., "Engine With Laser Ignition and Measurement," U.S. Appl. No. 13/689,578, filed Nov. 29, 2012, 54 pages.

Martin, Douglas R. et al., "Laser Ignition Safety Interlock System and Method," U.S. Appl. No. 13/870,327, filed Apr. 25, 2013, 30 pages.

Martin, Douglas R. et al., "Laser Ignition System Based Diagnostics," U.S. Appl. No. 14/152,811, filed Jan. 10, 2014, 85 pages.

Martin, Douglas R. et al., "Laser Ignition System Based Diagnostics," U.S. Appl. No. 14/152,833, filed Jan. 10, 2014, 85 pages.

Martin, Douglas R. et al., "Laser Ignition System Based Diagnostics," U.S. Appl. No. 14/152,851, filed Jan. 10, 2014, 84 pages.

* cited by examiner

LASER IGNITION SYSTEM BASED DIAGNOSTICS

FIELD

The present application relates to methods and systems for diagnosing an engine using a laser ignition system.

BACKGROUND AND SUMMARY

Vehicle engines may need to be intermittently serviced by a mechanic for diagnostic purposes. Diagnostics may involve visually inspecting engine components (for example, to identify scoring damage, camshaft alignment issues, etc.), rotating an engine to a selected position to identify component damage (for example, to detect hydro-lock) and/or spinning an engine (for example, to perform vacuum tests).

The inventors herein have recognized that some of the diagnostics can be time, cost, and complexity-intensive. In addition, for diagnostics that are sensitive to the position of the engine, small fluctuations in the engine position can substantially corrupt the result of the diagnostics. Further, it may be difficult to hold the engine in a selected position due to compression forces in the engine.

In view of the above issues, the inventors have developed a method for a hybrid vehicle system that allows accurate engine positioning for diagnostic purposes. In one example, the engine may be diagnosed by a method comprising, during selected non-combusting engine conditions in which the vehicle has been placed into a service mode, rotating the engine via an electric motor responsive to an operator input. In this way, engine positioning can be improved enabling a mechanic to reliably complete vehicle diagnostics.

In one example, a hybrid vehicle may be placed in a service mode during conditions when the engine is not combusting and the vehicle is not being driven. A mechanic may use a service diagnostic tool that is coupled to the vehicle to request the service mode. As such, in this mode, the mechanic may be able to perform one or more diagnostic tests, some of which may require specific engine positioning. For example, certain diagnostic tests may require the piston of a specific cylinder to be at a specified position. The mechanic may select a diagnostic test to be performed and may request a specific engine position. In response to the request, an electric motor of the vehicle system, coupled to the engine via the driveline, may be operated. The engine may be rotated by the electric motor to the requested engine position. Further, motor torque may be used to hold the engine at the requested position until mechanic has completed the diagnostic test. Upon completion, the mechanic may request a new position so as to perform another diagnostic test, in which case the electric motor is operated to rotate and reposition the engine. Else, if no further tests or engine positioning requests are received, the vehicle may be shifted out of the service mode, and returned to the operational mode where the vehicle can be driven.

In this way, an electric motor of a hybrid vehicle system can be used during a service mode to assist in engine positioning for diagnostics. By operating the motor to rotate and hold the engine at a specified position, accuracy of engine positioning is improved, and reliability of position-sensitive diagnostics is increased. By using existing vehicle hardware to position the engine, the need for costly and complex diagnostic tools is reduced. Overall, vehicle diagnostics can be simplified, and made time and cost efficient.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
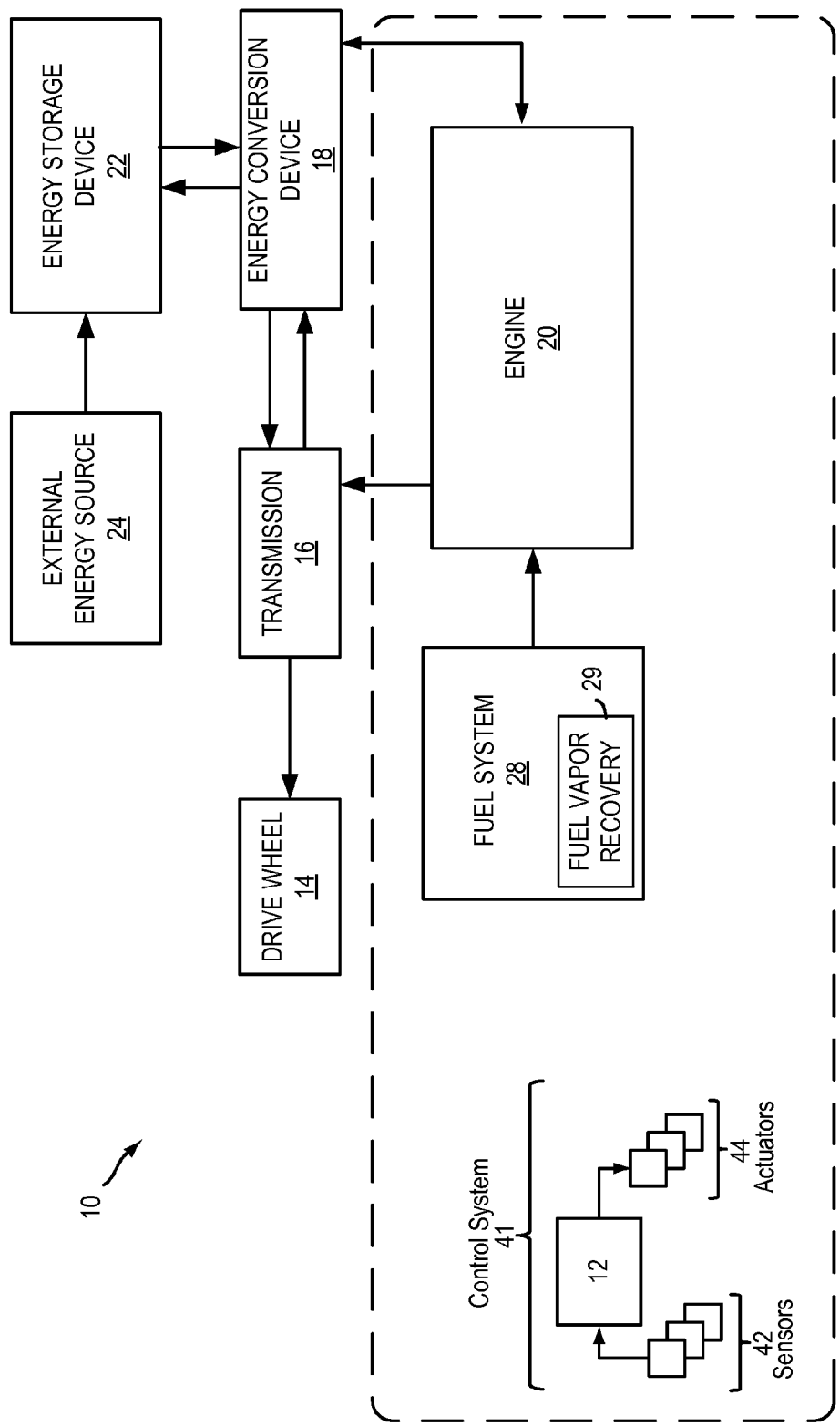
FIG. 1 shows an example hybrid vehicle system.
Figure 2:
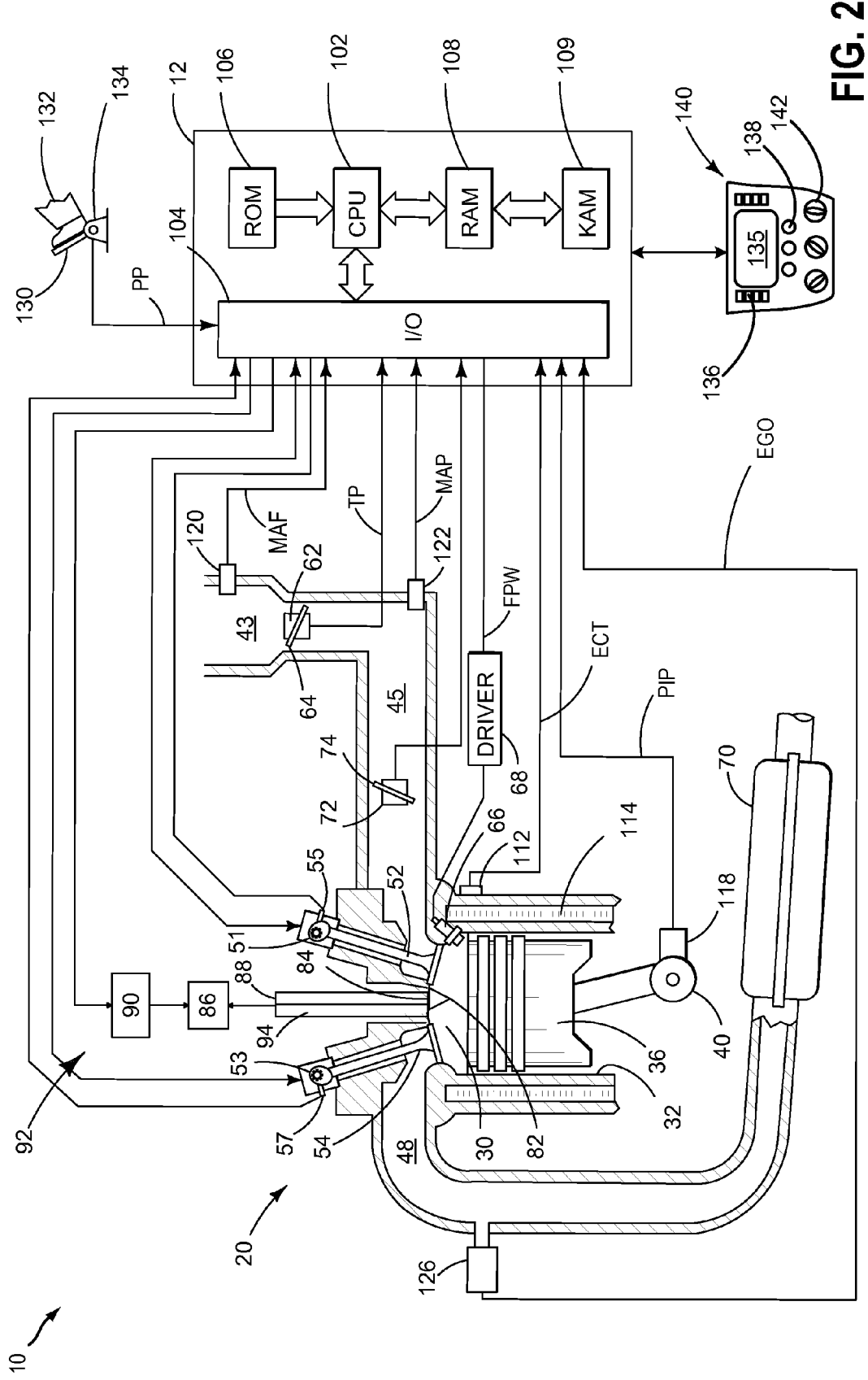
FIG. 2 shows an example internal combustion engine of the hybrid vehicle system of FIG. 1.
Figure 3:
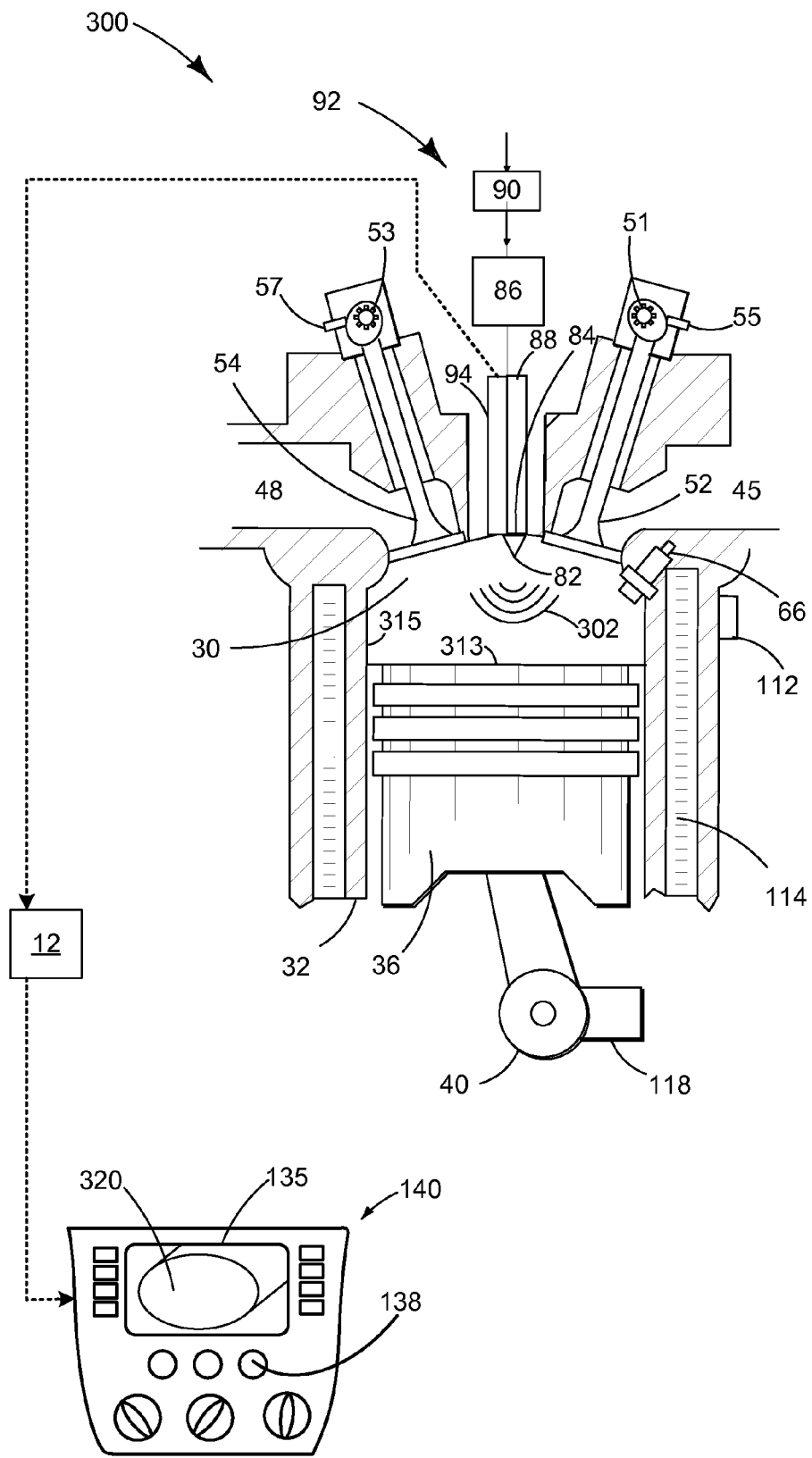
FIG. 3 shows an example of laser light pulse emission to an engine cylinder to enable visual inspection of an interior of the cylinder.

Methods and systems are provided for enabling visual inspection of an engine cylinder of a hybrid vehicle using an engine laser ignition system, such as the systems of FIG. 1-3. Low power laser pulses emitted by the laser ignition system (FIG. 3) can be used to generate images of the inside of the cylinder. The images may then be displayed on a center-console of the vehicle. An engine controller may be configured to perform a control routine, such as the routine of FIG. 4, to operate the laser ignition device in a diagnostic mode during non-combusting conditions. Images generated by a photodetector of the laser ignition system may be displayed to a service provider (or mechanic) on the center-console and used by the service-provider to infer cylinder damage. One or more knobs of the center-console may be activated when operating in the diagnostic mode for making refinements to the position of the engine that improve a view of the interior of the cylinder. In this way, engine diagnostics may be performed faster, and at a lower cost. An engine controller may be configured to perform a service routine, such as the routine of FIG. 5, to change the engine position during non-combusting conditions. In service mode, the operator is able to select a diagnostic test from a directory of diagnostic tests options located in the center-console display. Thus, selection of a diagnostic test activates an engine sensor that measures an initial engine position in order to move the engine to the requested engine position to perform the diagnostic test.

FIG. 1 schematically depicts a vehicle with a hybrid propulsion system 10. Hybrid propulsion system 10 includes an internal combustion engine 20 coupled to transmission 16. Transmission 16 may be a manual transmission, automatic transmission, or combinations thereof. Further, various additional components may be included, such as a torque converter, and/or other gears such as a final drive unit, etc. Transmission 16 is shown coupled to drive wheel 14, which may contact a road surface.

In this example embodiment, the hybrid propulsion system also includes an energy conversion device 18, which may include a motor, a generator, among others and combinations thereof. The energy conversion device 18 is further shown coupled to an energy storage device 22, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (in other words, provide a generator operation). The energy conversion device may also be operated to supply an output (power, work, torque, speed, etc.) to the drive wheel 14 and/or engine 20 (in other words, provide a motor operation). It should be appreciated that the energy conversion device may, in some embodiments, include a motor, a generator, or both a motor and generator, among various other components used for providing the appropriate conversion of energy between the energy storage device and the vehicle drive wheels and/or engine.

The depicted connections between engine 20, energy conversion device 18, transmission 16, and drive wheel 14 may indicate transmission of mechanical energy from one component to another, whereas the connections between the energy conversion device 18 and the energy storage device 22 may indicate transmission of a variety of energy forms such as electrical, mechanical, etc. For example, torque may be transmitted from engine 20 to drive the vehicle drive wheel 14 via transmission 16. As described above energy storage device 22 may be configured to operate in a generator mode and/or a motor mode. In a generator mode, system 10 may absorb some or all of the output from engine 20 and/or transmission 16, which may reduce the amount of drive output delivered to the drive wheel 14. Further, the output received by the energy conversion device may be used to charge energy storage device 22. Alternatively, energy storage device 22 may receive electrical charge from an external energy source 24, such as a plug-in to a main electrical supply. In motor mode, the energy conversion device may supply mechanical output to engine 20 and/or transmission 16, for example by using electrical energy stored in an electric battery.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used.

From the above, it should be understood that the exemplary hybrid propulsion system is capable of various modes of operation. For example, in a first mode, engine 20 is turned on and acts as the torque source powering drive wheel 14. In this case, the vehicle is operated in an "engine-on" mode and fuel is supplied to engine 20 (depicted in further detail in FIG. 2) from fuel system 28. Fuel system 28 includes a fuel vapor recovery system 29 to store fuel vapors and reduce emissions from the hybrid vehicle propulsion system 10.

In another mode, the propulsion system may operate using energy conversion device 18 (e.g., an electric motor) as the torque source propelling the vehicle. This "engine-off" mode of operation may be employed during braking, low speeds, while stopped at traffic lights, etc. In still another mode, which may be referred to as an "assist" mode, an alternate torque source may supplement and act in cooperation with the torque provided by engine 20. As indicated above, energy conversion device 18 may also operate in a generator mode, in which torque is absorbed from engine 20 and/or transmission 16. Furthermore, energy conversion device 18 may act to augment or absorb torque during transitions of engine 20 between different combustion modes (e.g., during transitions between a spark ignition mode and a compression ignition mode).

The various components described above with reference to FIG. 1 may be controlled by a vehicle control system 41, which includes a controller 12 with computer readable instructions for carrying out routines and subroutines for regulating vehicle systems, a plurality of sensors 42, and a plurality of actuators 44.

FIG. 2 shows a schematic diagram of an example cylinder of multi-cylinder internal combustion engine 20 included in a hybrid vehicle system, such as the hybrid vehicle of FIG. 1. Engine 20 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 20 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Combustion cylinder 30 may receive intake air from intake manifold 45 via intake passage 43 and may exhaust combustion gases via exhaust passage 48. Intake manifold 45 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. To enable detection of cam position, cam actuation systems 51 and 53 should have toothed wheels. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 43 in a configuration that provides what is known as port injection of fuel into the intake port upstream of combustion cylinder 30.

Intake passage 43 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. In other embodiments, the CMCV may be omitted. Intake passage 43 may include a mass air flow sensor 120 and a manifold air pressure sensor 122 for providing respective signals MAF and MAP to controller 12.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air/fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 109, and a data bus. The controller 12 may receive various signals and information from sensors coupled to engine 20, in addition to those signals previously discussed, including measurement of inducted mass air flow (MAF) from mass air flow sensor 120; engine coolant temperature (ECT) from temperature sensor 112 coupled to cooling sleeve 114; in some examples, a profile ignition pickup signal (PIP) from Hall effect sensor 118 (or other type) coupled to crankshaft 40 may be optionally included; throttle position (TP) from a throttle position sensor; and absolute manifold pressure signal, MAP, from air pressure sensor 122. The Hall effect sensor 118 may optionally be included in engine 20 since it functions in a capacity similar to the engine laser system described herein. Storage medium read-only memory chip 106 can be programmed with computer readable data representing instructions executable by processor 102 for performing the methods described below as well as variations thereof.

Engine 20 further includes a laser system 92. Laser system 92 includes a laser exciter 88 and a laser control unit (LCU) 90. LCU 90 causes laser exciter 88 to generate laser energy. LCU 90 may receive operational instructions from controller 12. Laser exciter 88 includes a laser oscillating portion 86 and a light converging portion 84. The light converging portion 84 converges laser light generated by the laser oscillating portion 86 on a laser focal point 82 of combustion cylinder 30.

A photodetector 94 may be located in the top of cylinder 30 as part of the laser and may receive return pulses from the top surface of piston 36. Photodetector 94 includes a camera with a lens. In one example, the camera is a charge coupled device (CCD). The CCD camera may be configured to detect and read laser pulses emitted by LCU 90. In one example, when the LCU emits laser pulses in an infra-red frequency range, the CCD camera may operate and receive the pulses in the infra-red frequency range. In such an embodiment, the camera may also be referred to as an infrared camera. In other embodiments, the camera may be a full-spectrum CCD camera that is capable of operating in a visual spectrum as well as the infra-red spectrum. The camera may include a lens for focusing the detected laser pulses and generating an image of the interior of the cylinder. In one example, the lens is a fish-eye lens that creates a wide panoramic or hemispherical image of the inside of the cylinder. After laser emission from LCU 90, the laser sweeps within the interior region of cylinder 30 at laser focal point 82. Light energy that is reflected off of piston 36 may be detected by the camera in photodetector 94.

Laser system 92 is configured to operate in more than one capacity. For example, during combusting conditions, laser energy may be utilized for igniting an air/fuel mixture during a power stroke of the engine, including during engine cranking, engine warm-up operation, and warmed-up engine operation. Fuel injected by fuel injector 66 may form an air/fuel mixture during at least a portion of an intake stroke, where igniting of the air/fuel mixture with laser energy generated by laser exciter 88 commences combustion of the otherwise non-combustible air/fuel mixture and drives piston 36 downward.

As another example, during non-combusting conditions, when operating in a diagnostic mode, the laser ignition device can be used to generate images of an interior of the cylinder. The images may be displayed to a mechanic on a center-console of the vehicle so that they can perform a visual inspection and identify any cylinder degradation. Specifically, the laser ignition device, coupled to photodetector 94, transmits light pulses into cylinder 30. Photodetector 94 includes an infrared camera equipped with a fish-eye lens that generates images that are transmitted wirelessly to an engine controller and viewed on the display of the vehicle. While operating the laser ignition device, an operator controlled knob on the center-console can adjust the engine position. These adjustments include turning the engine forwards or backwards from an initial engine position further allowing inspection and detection of cylinder degradation. As still another example, during other non-combusting conditions, when operating a position determination mode, the laser pulses may be used to determine the position of a piston within the engine cylinder. This enables more accurate engine position determination.

LCU 90 may direct laser exciter 88 to focus laser energy at different locations and at different power levels depending on operating conditions. For example, during combusting conditions, the laser energy may be focused at a first location away from cylinder wall 32 within the interior region of cylinder 30 in order to ignite an air/fuel mixture. In one embodiment, the first location may be near top dead center (TDC) of a power stroke. Further, the laser pulses used in this ignition mode to initiate cylinder combustion may be of a higher power level. Further still, LCU 90 may direct laser exciter 88 to generate a first plurality of laser pulses directed to the first location, and the first combustion from rest may receive laser energy from laser exciter 88 that is greater than laser energy delivered to the first location for later combustions. In addition, during ignition, the laser device may be pulsed quickly with high energy intensity to ignite the air/fuel mixture.

As another example, during non-combusting conditions, the laser energy may be used to identify the position of a piston of the cylinder, and thereby infer an engine position. Accurate engine position determination may be used during an engine start or restart to select a cylinder in which a first combustion event is initiated. During the determination of piston position, the laser device may sweep laser pulses with low energy intensity. For example, the laser may be frequency-modulated with a repetitive linear frequency ramp to determine the position of one or more pistons in an engine. Photodetector 94 located in the top of the cylinder may detect the light energy that is reflected off of the piston. An engine controller may determine the position of the piston in the cylinder based on a time difference between emission of the laser pulse and detection of the light reflected off the piston by the photodetector.

As yet another example, during non-combusting conditions, while operating in a diagnostic mode, the laser energy may be used to visually inspect an interior of the cylinder to identify engine degradation. Therein, the laser energy may be focused at a plurality of locations, such as from one end of cylinder wall 32, over the entire interior region of cylinder 30, to another end of cylinder wall 32, so as to sweep the entire cylinder. The laser device may sweep laser pulses with low energy intensity through the cylinder at a high frequency. For example, the laser may be frequency-modulated with a repetitive linear frequency ramp. In addition, different materials in the cylinder may be detected at the different frequencies. By scanning as much of the cylinder as possible very quickly, the laser acts as a wide beam or light bulb. The laser pulses used when operating in the diagnostic mode and the piston determination mode may be of a lower power level than the laser pulses used when operating in the ignition mode. In one example, the power level of the laser pulses used in the diagnostic mode may be substantially lower than the power level of the laser pulses used in the ignition mode, such as at a level that would not damage the eyes. Photodetector 94 located in the top of the cylinder may detect the light energy that is reflected off of the piston and walls of the cylinder and the CCD camera of the photodetector may capture images of the interior of the cylinder using the light beam generated by the laser. The images may then be transmitted and displayed to a vehicle operator who may identify cylinder degradation based on the images.

Vehicle system 10 may include a vehicle dashboard inside a cabin of the vehicle. The vehicle dashboard may include a center-console 140. As such, the center-console may be a control-bearing surface located in a central part of the vehicle cabin, in particular, in the front of the vehicle cabin. Center-console 140 may include various controls, such as knobs 138, dials 142, and buttons 136. The various controls may be actuated by a vehicle operator to adjust cabin conditions. The various controls may include, for example, a volume control knob 138 coupled to a music system of the vehicle for adjusting a volume of music in the cabin, a tuning button 136 coupled to a radio system of the vehicle for adjusting radio channel selection, and a temperature controlling dial 142 coupled to the vehicle's HVAC system for adjusting cabin heating and cooling temperatures.

The center-console 140 may also include a display 135. The display may be a touch-sensitive display that enables the vehicle operator to select settings of the vehicle via touch interactions. The display may also be used to display current vehicle settings. In addition, the display may be used to display a navigation system, such as GPS, phone capabilities, or web applications to be accessed during travel. During non-combusting conditions, when the laser ignition device is operated in a diagnostic mode, display 135 is used to depict images of the inside of cylinder 30 which are taken by photodetector 94 coupled to a laser detection system 92. Specifically, images of the interior of the cylinder taken by a CCD camera of the laser detection system are transmitted, for example wirelessly, to the engine control system and displayed on display 135 to a vehicle operator (e.g., a mechanic). Based on an operator display preference selected via touch interactions on the display, images of the cylinder interior of any or all the cylinders may be displayed. In addition, during the diagnostic mode, one or more of knobs 138 may be activated for engine position control (and deactivated for cabin control). For example, during non-combusting conditions, when operating in the diagnostic mode, the volume control knob may be activated for engine position control and deactivated for volume control. Consequently, adjustments to the volume control knob 138 can be used to adjust the engine position from an initial engine position to assist in the visual inspection of the cylinder. For example, it may be determined that the piston of the cylinder is positioned at or near a top of the cylinder currently displayed on display 135, obstructing a full view of the interior of the cylinder. To improve the view, the vehicle operator may slowly turn the volume control knob (e.g., clockwise or counterclockwise) which in turn moves the engine position (e.g., backwards or forwards) such that the piston is slowly moved towards the bottom of the cylinder via adjustments to a power-split generator/motor of the engine system. In embodiments where the engine includes a planetary gear transmission, the motor may hold the outer ring still (which keep the tire wheels still), while the generator (or sun gear), rotates the engine using feedback from either a resolver of the generator position, or using the 60-2 crank wheel with hall-effect sensor position system for actual engine position feedback. This movement of the piston may allow the operator to receive images representing a more complete view of the interior of the cylinder, and enable him to make a more precise inspection. For example, the improved view may enable the operator to inspect the cylinder walls for scoring damage. Further, during the diagnostic mode, the same volume control knob, or an alternate center-console knob, dial, or button may be activated to enable the image of the cylinder displayed on display 135 to be magnified (e.g., zoomed in to or out of).

Controller 12 controls LCU 90 and has non-transitory computer readable storage medium including code to adjust the location of laser energy delivery based on temperature, for example the ECT. Laser energy may be directed at different locations within cylinder 30. Controller 12 may also incorporate additional or alternative sensors for determining the operational mode of engine 20, including additional temperature sensors, pressure sensors, torque sensors as well as sensors that detect engine rotational speed, air amount and fuel injection quantity. Additionally or alternatively, LCU 90 may directly communicate with various sensors, such as temperature sensors for detecting the ECT, for determining the operational mode of engine 20.

As described above, FIG. 1 shows only one cylinder of a multi-cylinder engine, and each cylinder may similarly include its own set of intake/exhaust valves, fuel injector, laser ignition system, etc.

FIG. 3 illustrates an example embodiment 300 of how the laser system 92 (of FIG. 2) may emit laser pulses into cylinder 30 so that a photodetector of the laser system can capture images of the interior of the cylinder. The images may be displayed to a vehicle operator to enable visual inspection of the cylinder for damage. As such, components already introduced in FIGS. 1-2 are not re-introduced in FIG. 3.

FIG. 3 shows an example operation of the laser system 92 that includes a laser exciter 88, photodetector 94 and LCU 90. LCU 90 causes laser exciter 88 to generate laser energy. High frequency laser pulses are directed towards various locations of the cylinder to scan as much of the cylinder as possible. For example, pulses 302 may be directed towards cylinder walls 315, interior of cylinder 30, piston top surface 313 and inner surface of valves 52 and 54 (that is, the surface facing the cylinder). By scanning as much of the cylinder as quickly as possible, laser pulse 302 acts as a wide beam light source or light bulb enabling photodetector 94 (in particular, the CCD camera) to capture images 320 of the interior of the cylinder. As such, when operating as a light source for image capture during diagnostics, the laser ignition system (or laser device) may be considered to be operating in a projector or illuminator mode LCU 90 may receive operational instructions, such as a power mode, from controller 12. When operating in the diagnostic mode, the laser system 92 emits a series of low power pulses at high frequency. In comparison, during ignition, the laser may be pulsed quickly with high energy intensity to ignite the air/fuel mixture. In one example, during the diagnostic mode, the laser may be pulsed at the low energy level with a frequency-modulation having a repetitive linear frequency ramp. The low power frequent laser pulses may be emitted in the infra-red spectrum. A photodetection system, which includes a CCD camera operating in the infra-red spectrum (e.g., an infra-red CCD camera) with a fish-eye lens, may be located in the top of the cylinder as part of the laser and may capture cylinder images 320 using the light energy reflected off the interior of the cylinder. The captured images may include images of the cylinder walls 315, cylinder-facing surface of intake and exhaust valves 52 and 54, piston top surface 313 and the interior of cylinder 30. The captured images 320 are transmitted wirelessly by photodetector 94 to controller 12 for viewing on display 135 in the vehicle's center-console 140.

As discussed above, the low power light pulses may be emitted in the infra-red (IR) spectrum by the laser ignition device and the CCD camera is configured to operate in the IR spectrum. In alternate embodiments, photodetector 94 has a full-spectrum CCD camera that can be tuned to coordinate with the frequency of the laser; thus, the camera can operate in IR and other spectrums of light (e.g. daylight or light bulbs) and has the capability to disable the laser if non-IR light is detected. In some examples, the location of the piston may obstruct a full view of the interior of the cylinder in the displayed images 320 of the inside of the cylinder. Upon observing the images, the vehicle operator (e.g., a service technician or mechanic) can actively make adjustments to a position of the piston in order to better view the cylinder. For example, during conditions where images 320 indicate that the piston is near a top of the cylinder (e.g., at TCD), additional adjustments allow for the engine to be tuned slowly and precisely in order to move the piston down to the bottom of the cylinder. During the diagnostic mode, one or more knobs, dials or buttons of the vehicle center-console 140 may be activated for enabling engine position control wherein by operating the knob, dial, or button, a power-split generator/motor of the engine system is operated to adjust the engine position. In the depicted example, when the piston is near the top of the cylinder in view, the operator can adjust knob 138 located on the vehicle's center-console 140, in order to turn the engine forward or backwards from an initial engine position. If the engine is turned backwards from the initial engine position to move the piston downwards, the controller may concurrently open an intake throttle of the engine to reduce expansion of the intake manifold.

Figure 4:
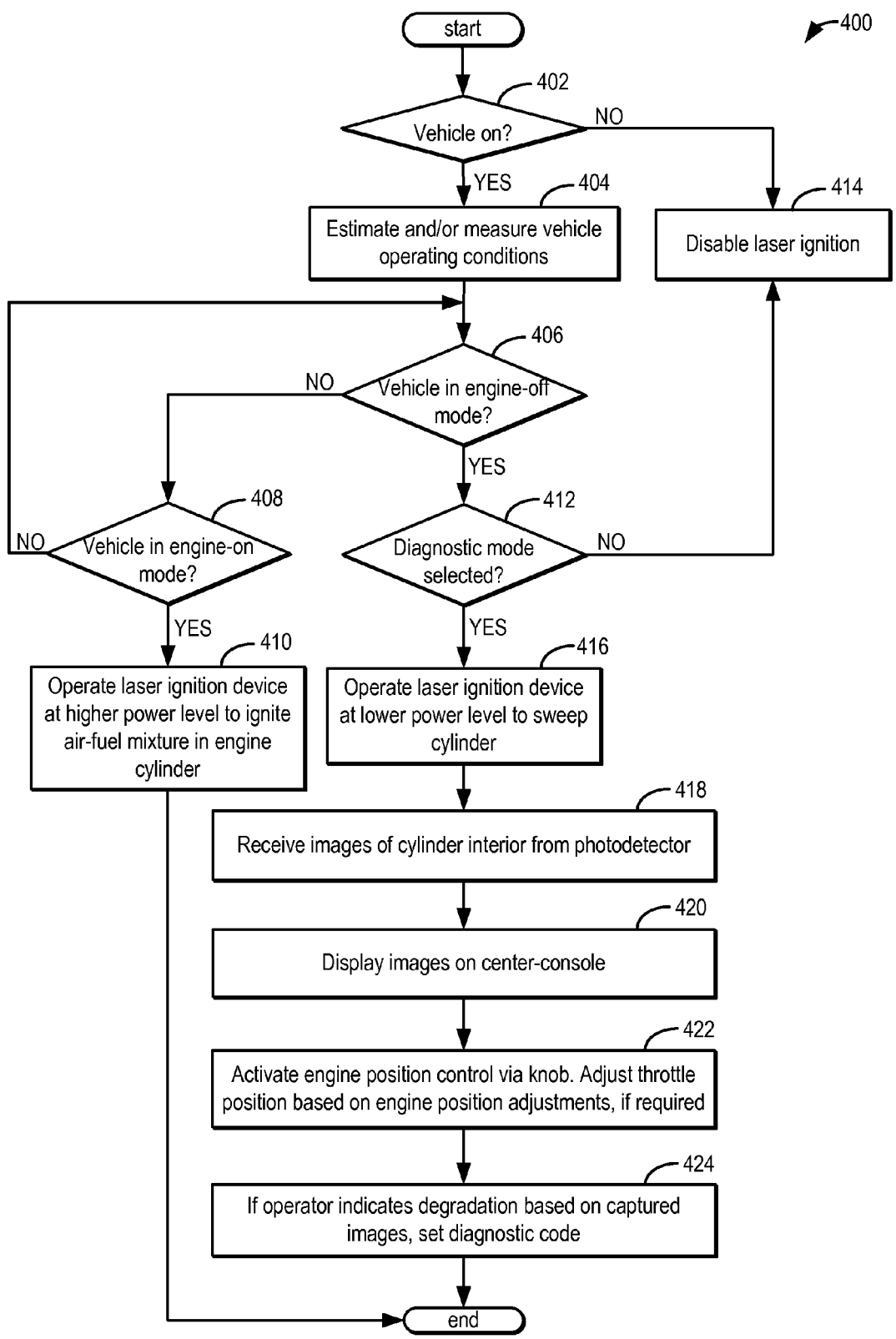
FIG. 4 shows a high level flow chart of a method for diagnosing cylinder degradation based on in-cylinder images generated by a photodetector during non-combusting conditions.

Now turning to FIG. 4, routine 400 depicts a method for diagnosing cylinder degradation based on in-cylinder images generated by a photodetector of a laser ignition system. The system takes images during non-combusting conditions for cylinder degradation diagnostic purposes. The method enables the engine to be visually inspected without having to remove any component from the cylinder thus allowing for a more expedited and simplified diagnostic test.

At 402, the method includes determining if the vehicle is on. In the depicted example, the vehicle is a hybrid electric vehicle. In one example, a vehicle-on condition may be confirmed based on a vehicle key-on event. If the vehicle is not on, at 414, the laser ignition is disabled. Upon confirming that the vehicle is on, at 404, the method includes estimating and/or inferring vehicle and engine operating conditions. These may include, for example, driver torque demand, vehicle speed, battery state of charge (SOC), engine speed, engine temperature, catalyst temperature, boost level, MAP, MAF, ambient conditions (temperature, pressure, humidity, etc.). As such, based on the vehicle operating conditions, a vehicle mode of operation may be determined. For example, if the driver demand is less than a threshold demand and the battery SOC is higher than a threshold charge level, the vehicle may be operated in an electric mode (also referred to as an engine-off mode or non-combusting mode) wherein the vehicle is propelled using power derived from the system electric motor and/or battery. As an alternate example, if the driver demand is higher than the threshold demand and/or the battery SOC is lower than the threshold charge level, the vehicle may be operated in an engine-on mode wherein the vehicle is propelled using power derived from cylinder combustion in the engine.

Accordingly, at 406, the routine determines if the vehicle is operating in the engine-off mode (herein also referred to as a non-combusting mode). If not, then at 408 it may be confirmed that the vehicle is in an engine-on mode (herein also referred to as a combusting mode). If the vehicle is in the combusting mode at 408, then at 410, the laser ignition device is operated to direct laser pulses into the cylinder at a higher power level to ignite an air-fuel mixture in the cylinder.

Returning to 406, if the vehicle is in the non-combusting mode, then at 412 it may be determined if a laser diagnostic mode has been selected. In one example, a diagnostic mode may be selected if the vehicle is on, in an accessory mode, and with a parking pawl of the transmission shifted to a "Park" position. The diagnostic mode may be selected at regular intervals of vehicle operation (such as after a threshold distance of vehicle operation or a threshold time of vehicle operation since a last diagnostic operation). Alternatively, the diagnostic mode may be actively selected by the vehicle operator via selections on the center-console. If the diagnostic mode is not selected and the vehicle is being operated in the engine-off mode, the routine returns to 414 to disable the laser ignition device.

If the laser diagnostic mode is selected by the vehicle operator at 412, the routine proceeds to 416 wherein the laser ignition device is operated to direct laser pulses at a low power level into an interior of the cylinder, in an infra-red spectrum, to sweep the cylinder. As such, the laser ignition system is operated at a lower power level in the diagnostic mode than the power level used during combusting conditions (at 410). Specifically, the laser ignition device emits frequent low power laser pulses throughout the cylinder, effectively acting as a light beam. In this way, the laser may be operated in a projector or illuminator mode during the diagnostics. The light beam generated by the laser pulses may be used by a photodetector coupled to the laser ignition device to capture images of the interior of the cylinder. The photodetector includes a camera and a light-converging lens. For example, the photodetector may be an infra-red camera (e.g., a CCD) with a fish-eye lens for generating images of an inside of the cylinder using the light from the laser pulses.

At 418, the routine includes receiving images of the interior of the cylinder, captured by the photodetector. In one example, the captured images are transmitted wirelessly within the engine system, from the photodetector to the engine controller. At 420, the received images are displayed to a vehicle operator on center-console of the vehicle (e.g., on a display device of the center-console). The images may be displayed in a cylinder-specific manner. In one example, images captured from all the engine cylinders may be displayed and the vehicle operator may use touch interactions on the display, or buttons of the center-console, to select a single cylinder for viewing. In addition, the operator may use buttons, knobs, or dials of the center-console, or other touch interactions with the display, to magnify the view of the cylinder (e.g., to zoom into the image of the cylinder in view). Herein, the vehicle operator may be service technician or mechanic capable of diagnosing engine degradation (e.g., cylinder wall scoring damage) based on the captured images.

At 422, the routine includes activating an operator-controlled knob of the vehicle center-console for engine position control. As such, this allows a knob, such as a radio volume control knob of the center-console, to be deactivated for volume control and activated for making adjustments to a position of the engine, and thereby, a position of the piston in the cylinder. The activated operator-controlled knob may be coupled to the engine via an electric motor-generator of the hybrid vehicle system during the non-combusting conditions such that a position of the piston within the cylinder is adjusted based on adjustments to the position of the knob by the vehicle operator. The vehicle operator may make the position adjustments based on the images captured by the photodetector and displayed on the display of the center-console. For example, if the captured images indicate that the piston of the cylinder in view is near a top of the cylinder, obstructing a view of the walls and valves of the cylinder, the vehicle operator may slowly turn the knob to tune the position of the engine, thereby precisely tuning the position of the piston to a position that provides a better view of the cylinder interior. Adjusting the position of the piston within the cylinder may entail turning the knob to rotate the engine backwards or forwards from an initial engine position. The controller may perform throttle position adjustments based on the tuning of the engine position, as required. For example, if the engine needs to be turned backwards from the initial position to bring the piston towards the bottom of the cylinder, then at 422, while turning the engine backwards, the controller may increase the opening of the intake throttle to reduce intake manifold expansion.

The vehicle operator may diagnose a state of the engine, including a state of the cylinder walls and valves, based on the images displayed to the operator on the center-console. As such, by using the images captured by the photodetector, the operator may be able to visually inspect the interior of the cylinder and identify degradation (such as valve damage or scourging damage). If degradation is determined by the vehicle operator based on the captured images, the operator may provide this indication to the vehicle control system (for example, by selecting a button on the center-console). The engine control system may then set a diagnostic code based on the operator input to indicate the engine degradation.

In this way, during a first combusting condition, a laser ignition device is operated to ignite an air-fuel mixture in the cylinder, and during a second non-combusting condition, the laser ignition device is operated to diagnose an interior of the cylinder. Herein, during the first condition, the laser ignition device is operated at a higher power level while during the second condition, the laser ignition device is operated at a lower power level. A photodetector is coupled to the cylinder for detecting laser pulses from the laser ignition device. During each of the first and second conditions, the laser ignition device may be operated to emit laser pulses in an infra-red spectrum and the photodetector may also be operated in the infra-red spectrum. The photodetector uses the light from the laser pulses during the second condition to capture images of the interior of the cylinder. An output of the photodetector (e.g., an image of the interior of the cylinder) may be transmitted to an engine controller and displayed to a vehicle operator on a vehicle center-console. The engine may be coupled to a hybrid electric vehicle, and during the diagnostics, an engine position may be actively changed by a vehicle operator (e.g., a mechanic) based on adjustments to an operator-controlled knob. Herein, the active engine position change may be enabled through the knob via an electric motor-generator of the hybrid electric vehicle. The controller may adjust a throttle position based on the change in engine position. For example, the throttle may be opened when the engine is rotated backwards from an initial position.

It will be further appreciated that in a third non-combusting condition, the laser ignition device may be operated at the lower power level to determine the position of a piston in the cylinder for engine position control. Therein, the photodetector coupled to the cylinder may detect the reflection of an emitted laser pulse off of the top surface of a piston. Based on a duration elapsed since a time when the laser is emitted by the laser ignition device and a time when the reflected laser pulse is detected by the photodetector, a controller may determine the piston position. Accurate engine position information may be used during a subsequent engine restart to identify a cylinder in which to perform a first combustion event, thereby improving engine restart times.

In this way, during non-combusting conditions, a laser ignition device may be operated for diagnostic purposes and cylinder degradation may be indicated based on the output of a photodetector coupled to the cylinder. By operating the laser ignition device to act as a light source, a camera of the laser ignition system can be advantageously used to capture images of the interior of a cylinder. This enables a mechanic to perform a visual inspection of the engine with reduced cost and time.

Figure 5:
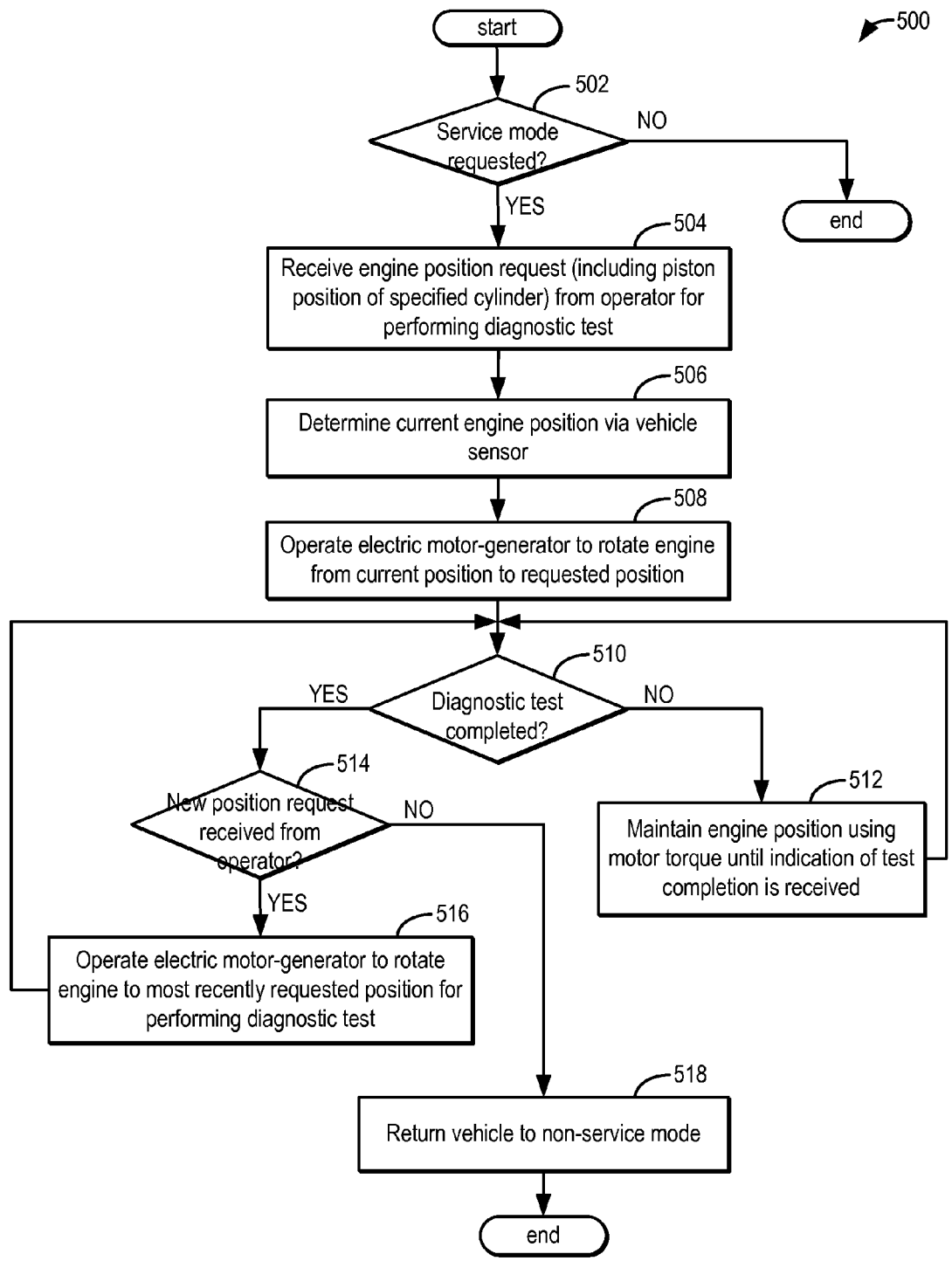
FIG. 5 shows a high level flow chart of a method for adjusting an engine position based on operator input to enable engine diagnostics to be performed.

Now turning to FIG. 5, routine 500 depicts a method for adjusting an engine position based on operator input to enable engine diagnostics to be performed. The system allows an electric motor of the hybrid vehicle system to rotate the engine to a requested position based on operator input enabling an operator to perform a plurality of diagnostic tests.

At 502, the method includes confirming that a service mode has been selected. A service mode may be confirmed during selected non-combusting conditions where a service mode has been selected by an operator. The operator may be a service technician, or mechanic, capable of diagnosing a state of the engine by performing one or more diagnostic tests. As such, the service mode may be selectable when the vehicle is not running, such as when the vehicle is parked with the engine turned off. Further, the service mode may represent a vehicle mode where vehicle components (e.g., engine, transmission, battery, etc.) are diagnosed. In one example, the operator may provide operator input selecting the service mode via a service diagnostic tool coupled to the vehicle. Alternatively, the operator may provide operator input selecting the service mode via a user interface of the vehicle (e.g., via a touch-interactive display on the vehicle's center-console, or via a button on the center console). If a service mode is not requested, the routine ends.

Upon confirming the service mode request, the controller may shift the vehicle to a service mode. In one example, in the service mode, the controller may present a plurality of diagnostic test options to the operator on the center-console display. The operator may be able to select a diagnostic test to be performed (e.g., a diagnostic test to be performed first in a series of diagnostic tests) from several options of diagnostic tests presented on the user interface displayed on the center-console of the vehicle. The plurality of diagnostic tests displayed on the user interface may include, for example, a hydro-lock test, a camshaft misalignment test, a cylinder visual inspection, etc.

At 504, the routine includes receiving an engine position request from the operator. The engine position request may be received from the operator via the service diagnostic tool. Alternatively, the engine position request may be received from the operator via the user interface on the center-console. The engine position request may include a requested piston position of a specified cylinder of the engine.

In one example, the engine position request may include a specific engine position (e.g., specific piston position in a specific engine cylinder) required to perform a specific diagnostic test. For example, the operator may select a diagnostic test to be performed (from the plurality of options displayed by the controller), as well as select an engine position at which to perform the selected diagnostic test. Herein, the controller may receive the operator diagnostic selection on the display while also receiving operator input regarding an engine position request (e.g., via the user interface or via the service diagnostic tool). In an alternate example, the controller may be pre-programmed with engine positions desired for selected diagnostic tests. For example, a look-up table of the controller may be populated with the data, and may be referenced by the controller in response to the operator diagnostic selection. Herein, the controller may only receive the operator diagnostic selection on the display and may infer an engine position request based on the operator diagnostic selection. For example, when a hydro-lock test is selected by the operator, the controller may infer that the requested engine position in an I-4 engine includes a piston of cylinder 2 of the engine being positioned at compression TDC so that the hydro-lock test can be performed. Alternately, the piston may be moved to the bottom of the cylinder the camera or detector may be used to look for fluid in the cylinder. Further still, the cylinder may be viewed for the presence of carbon build-up, a melted piston, or foreign objects.

At 506, the routine determines the initial engine position using a vehicle sensor. For example, the controller may receive an initial engine position estimate (including an estimate of the position of specific pistons of specified cylinders) from a vehicle's engine position sensor. Based on a difference between the initial engine position and the requested engine position, at 508, the routine includes rotating the engine via an electric motor of the vehicle system to the requested engine position. Specifically, the electric motor (which is coupled to the engine along a driveline) is operated to rotate the engine from the measured initial engine position to the requested engine position. In one example, the speed, torque, and/or power setting of the electric rotor may be based on the difference between the measured initial engine position and the requested engine position with the motor rotated faster when the difference is higher, and the motor rotated slower when the difference is lower. As such, once the engine is in the requested position, the selected diagnostic test may be initiated.

At 510, the routine determines if the diagnostic test is completed. As such, input regarding completion of the diagnostic test may be received from the operator via the user interface. For example, once the selected diagnostic has been successfully completed by the operator, the operator may actuate a button of the center-console, make a selection on the center-console, or uncouple the service diagnostic tool from the vehicle, to indicate that the test has been completed. If the test has not been completed, then at 512, the engine is maintained at the requested engine position via motor torque until an operator input indicating completion of the diagnostic test is received. Specifically, the engine position is maintained at the requested position via motor torque in order to counteract compression forces that may not be balanced.

It will be appreciated that while the routine suggests maintaining the engine position via the electric motor until the diagnostic test is completed, in alternate examples, based on the nature of the test, the engine may not need to be maintained. For example, some tests may require accurate pre-positioning but may not require the position to be held during the test. As one example, when the diagnostic test selected is a vacuum test, the engine may be rotated to a selected position, and then the engine may be spun (e.g., via the motor) to assess the engine's vacuum generation potential.

If input indicating that the diagnostic test is completed is received at 510, then at 514, it may be determined if a new engine position request has been received from the operator. In one example, upon completion of the first, initial diagnostic test, the operator may proceed to perform a second, subsequent diagnostic test. Herein, as at 504, the operator may select the diagnostic test to be performed (from the remaining options displayed by the controller), as well as select an engine position at which to perform the selected diagnostic test. Alternatively, the controller may receive the new operator diagnostic selection on the display and may infer a new engine position request based on the most recent operator diagnostic selection. In another example, upon completion of the diagnostic test, the operator may have completed engine diagnostics and no further diagnostic tests may need to be run. Herein, the operator may actuate a button of the center-console, or make a selection on the center-console, to indicate that no further engine position adjustments are required.

If there is no new position request at 514, and the operator input indicates completion of all diagnostic tests, then at 518, in response to receiving no further engine position requests from the operator, the controller shifts the vehicle from the service mode to a non-service mode (or operation mode). In particular, the engine is rotated via the electric motor to a default engine position (e.g., a default engine position used to restart the engine) and the vehicle is shifted into an operation mode (e.g. non-service mode) from the service mode.

Returning to 514, if the engine does receive a new engine position request and/or a further diagnostic test selection for a new diagnostic test from the operator, then at 516, the engine is rotated via the electric motor to the further requested engine position. Motor torque from the electric motor is then used to hold the engine at the requested position until the most recently selected diagnostic test is completed. Steps 510-516 are then reiterated based on operator input until the operator indicates that all the tests have been completed and no further engine position adjustments are required. When all the diagnostic tests are completed and no further engine position requests are received from the operator, the vehicle is returned to an operation mode. In this way, a service technician may advantageously use an electric motor of a hybrid vehicle system to accurately position an engine for performing engine diagnostics.

In one example, a hybrid vehicle system comprises an engine including a cylinder with a piston. The engine is coupled to an electric motor and drive wheels of the vehicle via a driveline. The vehicle system may contain a center-console including a display for receiving operator input. The system may further include a sensor for measuring an engine position and a controller for performing adjustments based on an operator selection of diagnostic tests. During engine non-combusting conditions, a service mode may be requested by the operator, responsive to which the controller, having computer-readable instructions, may shift the vehicle into a service mode. Once the vehicle is configured in the service mode, the display in the center-console of the vehicle may display a plurality of selectable diagnostic test options to the operator. The operator may select a diagnostic test on the display allowing the controller to receive an engine position request including a requested piston position of a specified cylinder of the engine. The controller may receive an initial engine position estimate from a vehicle sensor and may operate the electric motor so as to rotate the engine to the requested position. The electric motor operation may be based on a difference between the initial engine position estimate and the engine position request. After rotating the engine to the requested engine position, the engine may be maintained at the requested engine position while an operator-selected diagnostic test is completed. If further engine position requests and further diagnostic test operator selection inputs are received, the engine position is accordingly re-adjusted until all diagnostic tests are completed. When no further engine position request is received from the operator, the controller returns the vehicle to a non-service mode.

In this way, engine diagnostics may be performed during selected non-combusting conditions by using hardware existing in a hybrid vehicle having a laser ignition system. By operating a laser ignition device to provide light pulses that enable a photodetector to capture images of an interior of the cylinder, a visual inspection of the cylinder can be performed by a service technician in a cost and time-efficient manner. By also using the electric motor of the hybrid vehicle system to accurately position an engine at selected engine positions, position-sensitive diagnostic tests can be performed precisely and more reliably. In this way, the quality of engine diagnostics performed by a service technician can be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle engine, comprising:
during selected non-combusting engine conditions in which a vehicle has been placed into a service mode, receiving an operator input via a coupleable and uncoupleable service diagnostic tool coupled to the vehicle, wherein the operator input is a requested engine position including a piston position of a specified cylinder, and rotating the engine via an electric motor responsive to the requested engine position.

2. The method of claim 1, wherein the piston position includes positions ranging from near a top of the specified cylinder to a bottom of the specified cylinder.

3. The method of claim 2, wherein rotating the engine includes operating the electric motor to rotate the engine from an initial engine position to the requested engine position, wherein a speed, torque, or power setting of the electric motor is based on a difference between the initial engine position and the requested engine position with the motor rotated faster when the difference is higher, and the motor rotated slower when the difference is lower.

4. The method of claim 1, wherein the operator input further includes a diagnostic test selected on a user interface of the vehicle displaying a plurality of diagnostic test options, wherein once the engine is in the requested position, the selected diagnostic test is initiated.

5. The method of claim 4, wherein the user interface includes a display on a center-console of the vehicle.

6. The method of claim 5, further comprising measuring an initial engine position via a vehicle sensor, and wherein rotating the engine via the electric motor includes adjusting the electric motor based on a difference between the requested engine position and the measured initial engine position.

7. The method of claim 6, further comprising maintaining the engine at the requested engine position via motor torque until an operator input indicating completion of the diagnostic test is received.

8. The method of claim 7, further comprising, in response to the operator input indicating completion of the diagnostic test, shifting the vehicle from the service mode to an operation mode.

9. A method for a hybrid vehicle engine, comprising:
during a service mode of vehicle operation,
measuring an initial engine position using a vehicle sensor;
receiving an engine position request from an operator via a coupleable and uncoupleable service diagnostic tool coupled to a vehicle;
rotating the engine via an electric motor to the requested engine position; and
initiating a selected diagnostic test once the engine is in the requested position.

10. The method of claim 9, wherein the rotating includes operating the electric motor based on a difference between the initial engine position and the requested engine position to rotate the engine from the initial engine position to the requested engine position.

11. The method of claim 10, wherein the requested engine position includes a piston position of a specified cylinder of the engine, the piston position including positions ranging from near a top of the specified cylinder to a bottom of the specified cylinder.

12. The method of claim 10, wherein receiving the engine position request from the operator includes receiving the selected diagnostic test from the operator via the service diagnostic tool on a user interface of the vehicle displaying a plurality of diagnostic test options, and wherein the requested engine position is based on the selected diagnostic test.

13. The method of claim 10, further comprising, maintaining the engine at the requested engine position via motor torque until an operator input received from the diagnostic tool indicating completion of a diagnostic test is received.

14. The method of claim 13, the method further comprising, in response to receiving a further engine position request from the operator, rotating the engine via the electric motor to the further requested engine position; and in response to receiving no further engine position request from the operator, rotating the engine via the electric motor to a default engine position and shifting the vehicle from the service mode to a non-service mode.

\* \* \* \* \*